United States Patent

[11] 3,579,236

[72] Inventor Kurt Wilhelm Piechocki
 Uster, Switzerland
[21] Appl. No. 793,685
[22] Filed Jan. 24, 1969
[45] Patented May 18, 1971
[73] Assignee Zellweger, Ltd.
 Uster, Switzerland
[32] Priority Feb. 28, 1968
[33] Switzerland
[31] 2915/68

[54] TEMPLATE FOR EVALUATING PHOTOGRAPHS OF DOPPLER RADAR SPEED MEASUREMENTS
 9 Claims, 5 Drawing Figs.
[52] U.S. Cl. .................................................... 343/8, 343/6
[51] Int. Cl. .................................................... G01s 9/44
[50] Field of Search ........................................ 343/5 (MM), 6 (TV), 6, 8

[56] References Cited
 UNITED STATES PATENTS
 2,785,395 3/1957 Platzman .................. 343/8

| | | | |
|---|---|---|---|
| 3,148,015 | 9/1964 | Weaver ...................... | 343/8X |
| 3,178,704 | 4/1965 | Moore et al. ................ | 343/6 |
| 3,185,980 | 5/1965 | Gustafson et al. ........... | 343/6 |
| 3,206,748 | 9/1965 | Miller .......................... | 343/8 |
| 3,243,806 | 3/1966 | Handschin ................... | 343/8 |

*Primary Examiner*—Rodney D. Bennett, Jr.
*Assistant Examiner*—Malcolm F. Hubler
*Attorney*—Kenyon & Kenyon, Reilly, Carr & Chapin

ABSTRACT: A doppler radar vehicle speed measurement template is provided with a representation of the photograph zone intersecting with a horizontal line representing the horizon of the road and a vertical line representing the vertical plane of the optical axis of the camera. The template is laid over the photograph with the vertical and horizontal lines aligned with the center of the photograph and with either the vanishing point of the road or a point at the height of the camera to accurately locate the vehicle in the photograph zone.

Patented May 18, 1971

INVENTOR
KURT WILHELM PIECHOCKI
BY
Kenyon & Kenyon
ATTORNEYS

Patented May 18, 1971

INVENTOR
KURT WILHELM PIECHOCKI
BY
Kenyon & Kenyon
ATTORNEYS

TEMPLATE FOR EVALUATING PHOTOGRAPHS OF DOPPLER RADAR SPEED MEASUREMENTS

This invention relates to a method and apparatus for evaluating automatically taken photographs of Doppler radar speed measurements and particularly for road vehicles.

It has been known to use Doppler radar speed-measuring devices, for example, in traffic control for the purpose of observing the maintenance of speed limits. Usually, in order to obtain evidence of a vehicle exceeding a posted speed limit, the photographs have been taken automatically. The photographs which have been obtained in this manner ordinarily show a portion of road with one or more vehicles as well as speed figures which are blended in by optical means, for example, the scale of a speed-measuring instrument graduated in miles per hour. The measurements of these radar speed measuring devices have been based upon an evaluation of the Doppler frequency $f_D$ which has been obtained in known manners by superimposing the radar output reflected from a moving vehicle on a part of the radar output produced by the radar transmitter.

However, while these heretofore methods and devices obtain measurements of sufficient accuracy for practical needs, doubts have arisen as to the accuracy of a measurement for a given vehicle when a number of vehicles appear in a photograph taken automatically. For example, such doubts and inaccuracies can arise in the cases of a dense traffic flow, multilane roads and a flow of traffic in two opposite directions.

In order to eliminate these inaccuracies, attempts have been made to obtain better triggering of the camera with respect to different vehicles. In some instances, the Doppler speed-measuring devices have been set at an angle of 20° relative to the direction of travel of the vehicles as this angle is the angle between the axis of the direction characteristic of the radar antenna and the direction of travel. Thus, the direction in which the camera faces lies in the same vertical plane (i.e. parallel) as the axis of the direction characteristic of the radar antenna. In other instances, where a vehicle is to be measured from the rear while the vehicle moves away and the camera has been set at an angle of 20° as above, the vehicle is not usually in such a position at the instant of the speed measurement that its license plate can be photographed. Thus, the triggering of the camera has been advantageously delayed chronologically so that the vehicle is able to arrive at a position suitable for photographing, i.e. in the photograph zone. Such a delay can, for example, be selected in accordance with the following parameters:

a time delay fixed relative to the entry of the vehicle into the radar zone;

a time delay inversely proportional to the vehicle speed upon entry into the radar zone;

triggering of the camera at the instance the vehicle leaves the radar zone without supplemental delay.

However, these three techniques have a common drawback in that the traffic situation between the instant of actual measurement and the instant of photographing can change in such a way as to preclude a definite association of the measured value with the measured vehicle. Consequently, devices of this type yield photographs that can be evaluated only when a single vehicle is in or in the vicinity of the effective radar zone at the instant of photographing. Because of this, the devices have had limited use in heavy traffic.

One method and apparatus for overcoming these above disadvantages and which obtains accurate measurements and identifications have been described in a copending U.S. Pat. application corresponding to Swiss Pat. application No. 2266/68. In this patent, an apparatus is disclosed for triggering a camera associated with a Doppler radar speed-measuring device wherein, at the instant of photographing, the measured vehicle is located in the photozone which is located relative to the road but is not, however, marked on the road. This apparatus further establishes through a combined monitoring and computing apparatus whether any other vehicle having a speed different from the measured vehicle is situated in the effective radar zone during the interval of time between the measurement of the speed and an instant shortly before triggering of the camera. Only when this has been established is the camera triggered to take a photograph.

In the case of dense traffic, photographs taken with the aforesaid apparatus generally show other vehicles in or near the effective radar zone along with the measured vehicle. It is for this reason necessary to identify definitely the measured vehicle in the photograph.

It is known that the photozone which is fixed relative to the road but is not marked on the road can be blended into the photograph by means of a plate marked with lines and set in the image plane of the camera. So long as the combination apparatus, radar plus camera, is set up as prescribed, no objection can be made to this method. However, it has been found in practice that the setting up of the apparatus is always associated with small and almost inevitable angular errors (azimuth and elevation). Further, the marked plate method is most sensitive to errors of the direction in which the camera faces, that is, when the optical axis of the camera is not directed parallel to the plane of the road.

It is easy to see that the landscape appearing in the field of view of the camera becomes displaced downward or upward when the camera is tilted up or down. The plate marked with lines, which is fixed relatively to the field of view of the camera, then apparently moves in the opposite direction. Because the camera sees the section of road which is of interest at an acute angle, angular errors of the order of magnitude of one degree mean considerable shifts of the blended-in lines for relatively distant points of the landscape.

Accordingly, it is an object of the invention to accurately detect a speeding vehicle from a radar speed-measured photograph.

It is another object of the invention to align a radar speed-measured photograph with a horizon to correct for errors in camera tilt.

It is another object of the invention to provide a template for superimposing on a photograph to correctly locate the photozone of the photograph.

Briefly, the invention provides a method and apparatus for use with a camera associated with a Doppler radar speed-measuring apparatus, e.g. as described in a copending U.S. Pat. application and Swiss Pat. application 2266/68, wherein the camera takes a photograph of a certain zone located relative to the road which is, however, not marked on the road but nevertheless is the zone in which the speed-measured vehicle is located. This zone is referred to as the photograph zone.

The method of the invention serves to eliminate errors in the determination of the location of the photograph zone which errors are caused by inaccurate setting up of the radar and camera equipment. The method achieves this error elimination by the aid of the horizon of the road plane in the photograph. That is, once the photograph has been taken, the photograph has a vertical line superimposed over the center to indicate the vertical plane of the optical axis of the camera as well as a horizontal line coincident with the horizon of the road. These horizontal and vertical lines thus intersect at a point on the photograph which point also represents the intersection of the photograph zone with the horizontal and vertical lines.

The apparatus of the invention includes a template of transparent structure which is provided with a vertical line representing the vertical plane of the optical axis of the camera of the speed-measuring apparatus, a horizontal line representing the horizon of the road plane in a photograph, and a central perspective representation of the photograph zone. The point of intersection of the horizontal and vertical lines is made to also be at the vanishing point of the photograph zone.

The template may also have supplementary lines or gratings for aligning with a photograph to further facilitate manipulation in evaluating a photograph. Further, the representation of the photograph zone can be duplicated symmetrically about the vertical lines for use with opposing lanes of traffic.

These and other objects and advantages of the invention will become more apparent from the following detailed description and appended claims taken in conjunction with the accompanying drawings in which:

Figure 1:
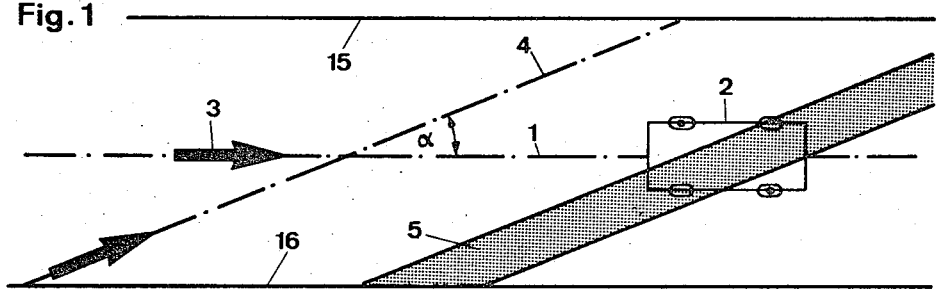
FIG. 1 illustrates a plan view of the photograph zone of a camera relative to a road and to the axis of the directional characteristic of an associated radar antenna.

Referring to FIG. 1, a vehicle 2 that is moving in the direction of the arrow 3 follows a lane having a center 1 which passes through radar zone and photozone 5 of a Doppler radar speed-measuring apparatus set at a side of the road. The photozone 5 is delimited on the road having road edges 15 and 16, by two parallel lines which run parallel to the axis 4 of the directional characteristic of the radar antenna. The axis 4 thus forms an angle $\alpha$ with the center 1 of the direction of travel. The spacing of the photograph zone 5 from the axis 4, and its width, result from the characteristics of the Doppler radar speed-measuring apparatus employed, and may, for example, be determined by practical tests made while different vehicles are passing, so as to obtain a standardized setup of the Doppler radar speed-measuirng apparatus and of its associated camera. For example, the standardized setup means includes setting up the apparatus combination of radar and camera with a specified angle $\alpha=20°AH$; setting the camera at a height of 130 +or −20cm. above the plane of the road facing the direction of the same vertical plane as the axis 4 of the directional characteristic of the radar antenna; and placing the optical axis of the camera parallel to the plane of the road.

Figure 2:
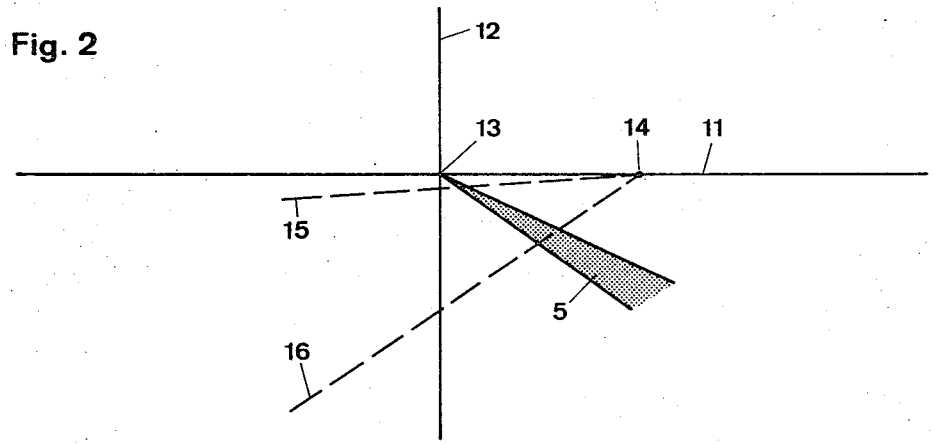
FIG. 2 illustrates a central perspective representation of the photograph zone through the camera.

Referring to FIG. 2, a central perspective representation from the camera outlook on a plate includes a line 11 which represents the horizon line, and a vertical axis 12 which represents the projection of the vertical plane going through the optical axis of the camera and the axis 4 of the direction characteristic of the radar antenna. The vanishing point of the parallel road edges 15 and 16 is at 14. The vanishing point of the delimiting lines of the photograph zone 5 is situated at the intersection 13 of the horizon line 11 and the vertical axis 12.

Figure 3:
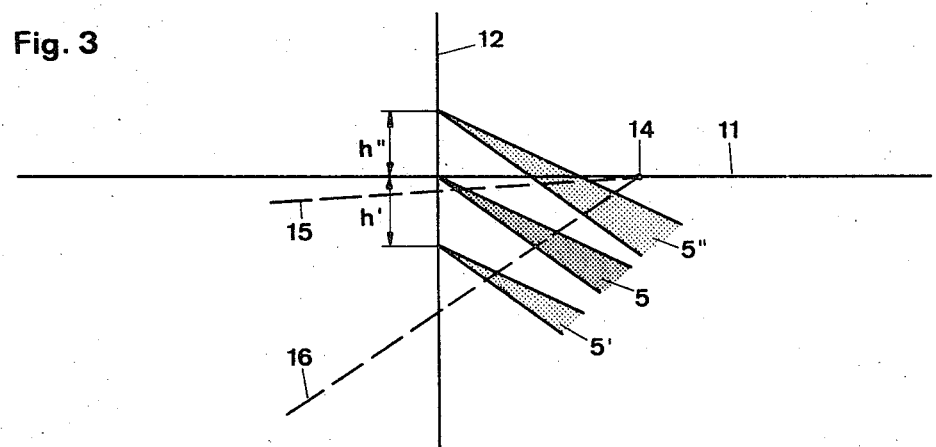
FIG. 3 illustrates the dependent relation between the representation of the photograph zone and the tilt of the camera.

Referring to FIG. 3, with a correct setup of the camera, the photograph zone marked on the lined plate is depicted in correct location 5 relative to the road, and thus also relative to the horizon line 11 of this road. With the camera tilted downward, the representation 5' of the photograph zone appears below the horizon line by an amount $h'$ while with the camera tilted upward, the representation 5'' of the photograph zone appears above the horizon line 11 by an amount $h''$.

Figure 4:
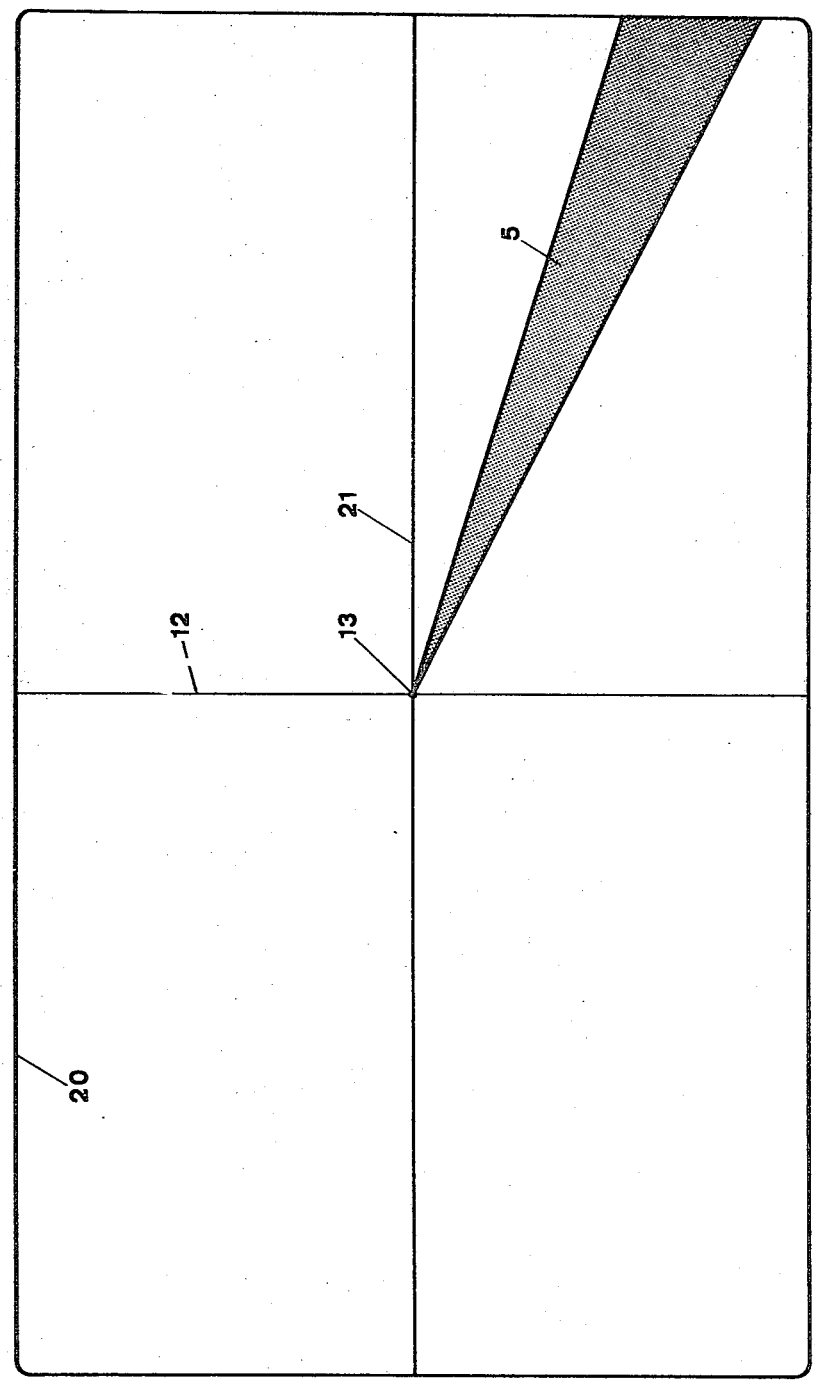
FIG. 4 illustrates a template of the invention.

Referring to FIG. 4, wherein like reference numbers have been used to indicate like parts as above, a template 20 of transparent material such as a plate or foil is constructed to have lines formed therein which correspond with the correct location of a photograph zone for the radar and camera speed-measuring apparatus correctly set up at roadside. In this instance, horizontal line 21 corresponds to the horizon line 11 described above, line 12 corresponds to the vertical axis of the optical axis of the camera, and so forth.

Figure 5:
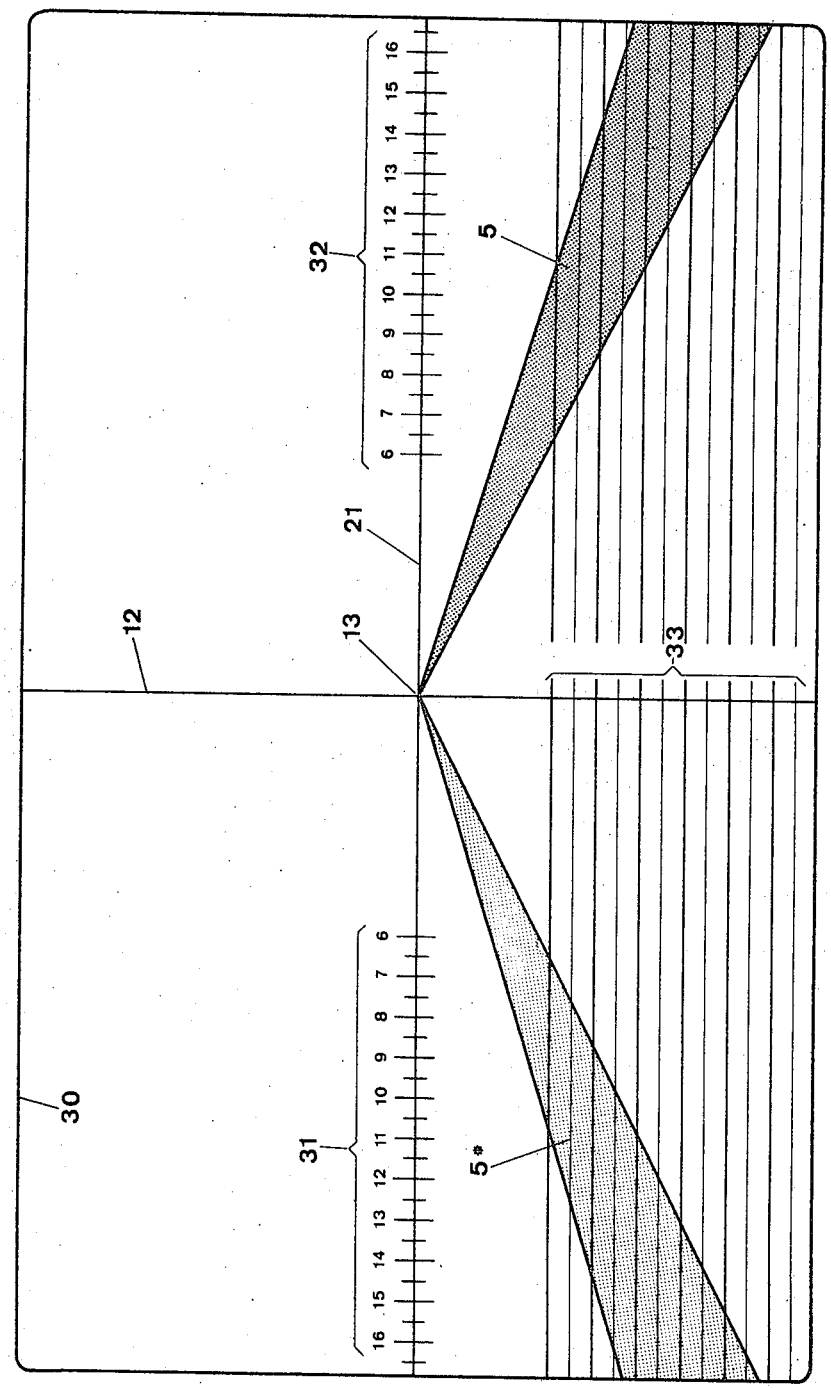
FIG. 5 illustrates a modified template of the invention.

Referring to FIG. 5, wherein like reference numbers have been used to indicate like parts as above, a template 30 can be formed with supplementary marks 31 and 32 which are related symmetrically to the vertical axis 12 and are disposed on the horizontal line 21 in uniformly spaced and numbered sequence. The template 30 also contains, parallel to its edge, a grating 33 composed of a plurality of parallel spaced horizontal lines for facilitating moving the template parallel to the picture edges. In order to enlarge the scope of application, the template 30 also contains a photograph zone 5* disposed symmetrically of the vertical axis 12 for the case where the Doppler radar speed-measuring apparatus is monitoring the traffic on an opposite other side of the lane 1 of FIG. 1.

In order to use either template 20 or 30, a photograph which has been taken is evaluated by correctly placing the transparent template 20, 30 over the photograph.

This is done by means of the intersection of the axis lines 21 and 12. The template is placed so that its vertical axis 12 coincides with the middle perpendicular of the photograph and, in the direction of the height of the photograph, so that its horizontal line 21 coincides with the virtual horizon 11 (cf. FIG. 2) of the road plane upon the photograph.

The next step is to recognize the virtual horizon of the road plane in the photograph being evaluated.

If the vanishing point 14 of the road is laid upon the picture, then the height of the horizon can be definitely determined. The horizontal line 21 of the template need then merely be set through this vanishing point 14. However, the vanishing point 14 in the present case lies alongside the picture. Unfortunately, the vanishing point 14 cannot be constructed in every case because often definite vanishing point lines are lacking in the picture.

A simpler method for determining the height of the horizon of the road plane consists in locating such points on the photograph, as in Nature, lie at the same level as the camera taking the picture, e.g. in the present case 130+or −20 cm. above the road plane. For example, the upper edges of the side windows of ordinary passenger cars can be used with good approximation. The influence of possible greater deviations between the height at which the camera is set and the car height can be eliminated by considering only far-off cars for determining the height of the horizon in the picture. In order that any lateral askewness may have as small as possible an influence on the determination of the height of the horizon, by far-off cars is meant not those at a far edge of the picture, but cars near the middle perpendicular of the picture that are passing the measuring location on as far off a lane as possible. If only cars that are supposed to lie in the photozone are considered, then far-off cars automatically meet this requirement, as can be seen from the position of the wedge apex in the photograph zone 5 shown in FIG. 2.

With respect to the template 20 or 30, this means the following:

Because in the evaluation, an entire film of exposures taken from the same location is generally available, those photographs are selected from the group of pictures that are estimated to have the farthest-off passenger cars in the photograph zone in front of a well-defined stationary background. The height of the upper edge of the side windows can then be transferred to the stationary background as a mark M. The corresponding marks M are thus placed on all the photographs taken with the same camera set up as being associated with the height of the horizon. The template 20 or 30 can therefore be adjusted with its horizontal line 21 at the level of the mark M on the photograph. Now, when the template 20 or 30 is correctly superposed on the photograph that is to be evaluated, the photograph zone 5, which is represented on the template, is also situated at the correct place, that is, where measured cars are photographed by the camera.

While the evaluation has been described with respect to a photograph, the evaluation can also be made directly from the negative film by the aid of a projector for projecting the image of the film onto a projection screen or wall and of a mobile larger scale template which is set on the projection screen or wall.

Further, in addition to an inaccurate tilting of the camera when set up, the camera could also be set laterally askew. However, the errors resulting from this positioning are negligible as compared to an inaccurate tilting of the camera since the resulting displacement of the photograph zone in the photograph looking in the direction of travel, i.e. rotation of the image of the photograph zone about the intersection 13 as shown in FIG. 2, does not vary any more for remote points than for close points. In FIG. 1, this would be represented by a parallel displacement of the image of the photograph zone 5.

It is noted that the distance between the road and the location where the speed-measuring apparatus is set up is immaterial with respect to the method of evaluating the photographs which are taken. Thus, even with a fixed setup location of the apparatus and a number of lanes of traffic, variable spacings are satisfactory.

Also, as a result of the central perspective image, the format of the photograph plays no part in evaluating with the templates of the invention.

The invention thus provides a convenient method and apparatus for correctly designating the measured car in a speed-measuring photograph independently of any erroneous tilting of the camera which made the photograph.

I claim:

1. An apparatus for locating a vehicle on a road in the photograph zone of a photograph of a doppler radar speed-measuring apparatus having a central perspective representation of the photograph zone thereon, a vertical line representing the vertical plane of the optical axis of the apparatus thereon, and a horizontal line representing the horizon of the road plane thereon, said vertical line, horizontal line and the vanishing point of said photograph zone representation intersecting at a common point.

2. An apparatus as set forth in claim 1 wherein said representation and said lines are on a transparent template.

3. An apparatus as set forth in claim 2 wherein said template further includes a second representation of the photograph zone symmetrically of the vertical line from the first representation.

4. An apparatus as set forth in claim 2 wherein said template includes supplementary marks set symmetrically relative to the perpendicular middle of the photograph on a horizontal line for lateral centering of said template relative to the photograph.

5. An apparatus as set forth in claim 4 wherein said template further includes a grating of horizontal parallel lines parallel to an edge of the photograph for moving said template parallel to said edge.

6. Apparatus for the evaluation of photographs taken with a camera having an azimuth fixedly related to a doppler radar speed-measuring system having a radar antenna whereby the optical axis of the camera lies in a vertical plane extending through the axis of the direction characteristic of the radar antenna; said apparatus comprising a central perspective representation related to the location of the camera of a specific photozone fixedly related to the doppler radar speed-measuring system and to a road without a marking of the road, said central perspective representation further including representations of the horizon of the road, said vertical plane through the optical axis of the camera and the axis of the direction characteristic of the radar antenna.

7. An apparatus as claimed in claim 6 further including representation of the photozone symmetrical to said central perspective representation with respect to a vertical axis.

8. An apparatus as claimed in claim 6 wherein said central perspective representation is on a template and marks are applied on said template symmetrically to the center vertical line of the photograph for laterally aligning said template on the photograph to be evaluated.

9. An apparatus as claimed in claim 8 wherein said template further includes a grating parallel to the edges of the photograph.